CLARK & GRAY.
Carriage-Wheel.

No. 12,897.

Patented May 22, 1855.

UNITED STATES PATENT OFFICE.

D. W. CLARK AND S. H. GRAY, OF BRIDGEPORT, CONNECTICUT.

CARRIAGE-WHEEL.

Specification of Letters Patent No. 12,897, dated May 22, 1855.

*To all whom it may concern:*

Be it known that we, D. W. CLARK and S. H. GRAY, of Bridgeport, in the county of Fairfield and State of Connecticut, have invented a new and useful Improvement in the Construction of Carriage-Wheels; and we do hereby declare that the following is a full, clear, and exact description of the same, reference being had to the annexed drawings, making a part of this specification, in which—

Figure 1:
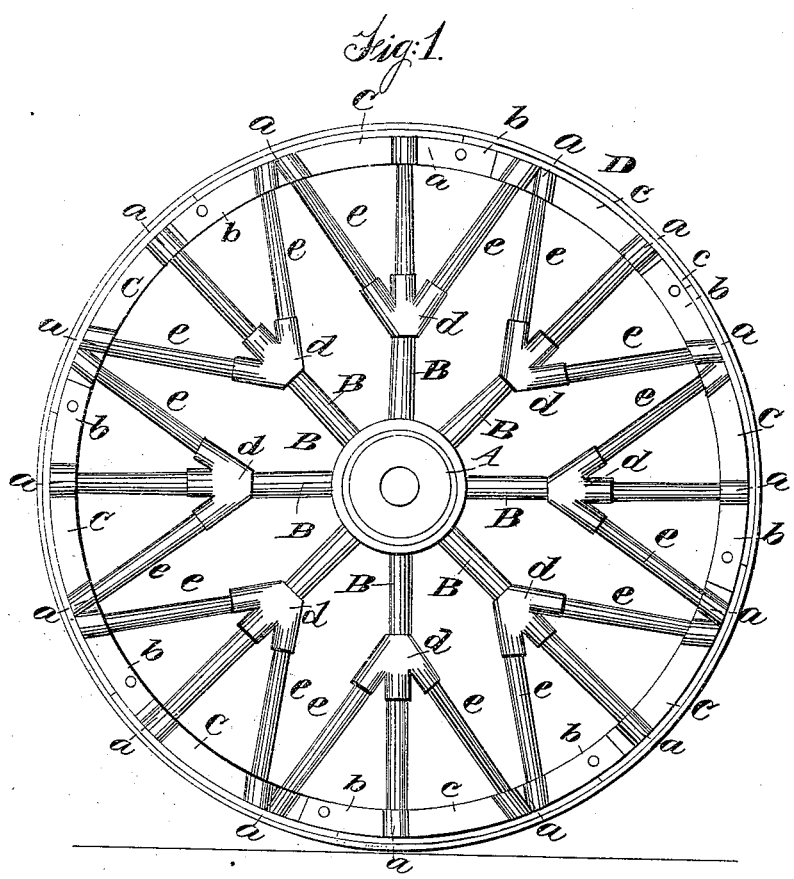
Figure 2:
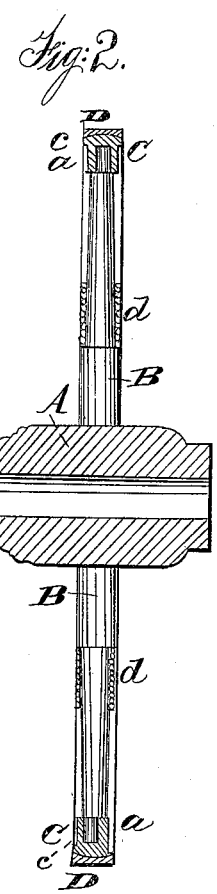

Figure 1 is a front or face view of our improved wheel. Fig. 2 is a section of ditto, the plane of section passing longitudinally through the center of the hub.

Similar letters of reference indicate corresponding parts in the two figures.

The nature of our invention consists in the peculiar construction of the wheel as will be hereinafter fully shown and described whereby a light and at the same time strong and durable wheel is obtained.

A, represents the hub of the wheel, and B, are spokes which are fitted in mortises in the hub.

C, are the fellies constructed of malleable cast iron, and having sockets (*a*) formed on their inner surfaces, the fellies also having a thin flanch (*b*) on their inner surfaces between the sockets (*a*). The outer edges of the fellies are formed of flanches (*c*) which are placed at right angles with the thin flanches (*b*).

The sockets (*a*) and flanches (*b*) (*c*) are cast in one piece. The outer edges of the fellies or the flanches (*c*) are made either convex or concave to correspond inversely with the inner surface of the tire D, which fits over the fellies and is secured on them without the aid of bolts, see Fig. 2. The tire is shrunk on the fellies in the usual manner.

The outer ends of the spokes B, are fitted in the sockets which are radial with the hub A, and upon the spokes B, at about midway between the hub and sockets (*a*) there are attached metal sockets (*d*) in which the lower ends of short oblique spokes (*e*) are fitted, two short spokes at opposite sides of each long spoke as shown in Fig. 1. The outer ends of the short spokes are fitted in oblique sockets (*a*) on the inner surfaces of the fellies.

By the above invention it will be seen that but few mortises are made in the hub, as but about half the usual number of spokes are inserted in the hub. The short spokes (*e*) giving the necessary support to the fellies and also bracing the long spokes B.

The improvement is principally designed for light carriage wheels where small hubs are required, which hubs are much weakened by mortises in the usual mode of construction.

It will readily be seen that a light, strong, and durable wheel is obtained by our improvement. The fellies being constructed of malleable cast iron are light and durable and are much superior to the steamed wooden fellies in use, which flatten or become depressed between the spikes. The fellies C, may be cast in segments and their ends secured together by the bolts.

Having thus described our invention what we claim as new and desire to secure by Letters Patent, is,

Constructing the wheel as herein shown and described, viz, having the fellies C, constructed of malleable cast iron in the form herein shown, and having the spokes B, fitted in mortises in the hub A, and in sockets (*a*) on the inner surfaces of the fellies, the spokes B, having sockets (*d*) secured on them at about their centers, in which the inner ends of short obliques spokes (*e*) are fitted the outer ends of said spokes (*e*) being fitted within oblique sockets (*a*) on the inner surfaces of the fellies, as herein shown and described.

D. W. CLARK.
S. H. GRAY.

Witnesses:
SAMUEL WINE,
JOHN SMITH.